(12) United States Patent
Chou et al.

(10) Patent No.: US 8,266,363 B2
(45) Date of Patent: Sep. 11, 2012

(54) KVM SWITCH HAVING UNIVERSAL INPUT AND PROGRAMMABLE USB HUB AND SWITCHING CONTROL METHOD THEREOF

(75) Inventors: Cheng-Sheng Chou, New Taipei (TW); Hung-June Wu, New Taipei (TW)

(73) Assignee: June-on Technology Co., Ltd., New Taipei (TW)

( * ) Notice: Subject to any disclaimer, the term of this patent is extended or adjusted under 35 U.S.C. 154(b) by 48 days.

(21) Appl. No.: 13/161,743

(22) Filed: Jun. 16, 2011

(65) Prior Publication Data

US 2011/0246676 A1 Oct. 6, 2011

Related U.S. Application Data

(63) Continuation-in-part of application No. 12/542,338, filed on Aug. 17, 2009, now abandoned.

(51) Int. Cl.
*G06F 13/00* (2006.01)
(52) U.S. Cl. ........................................... 710/316
(58) Field of Classification Search .................... 710/316
See application file for complete search history.

(56) References Cited

U.S. PATENT DOCUMENTS 6,557,170 B1 * 4/2003 Wilder et al. ............... 725/130
2005/0273312 A1 * 12/2005 Sandulescu et al. ........... 703/25

* cited by examiner

*Primary Examiner* — Paul R Myers
*Assistant Examiner* — Jeremy S Cerullo
(74) *Attorney, Agent, or Firm* — Chun-Ming Shih; HDLS IPR Services (57) ABSTRACT

A KVM switch of universal input and programmable USB hub includes a main control unit (MCU) chip and a switching control method are disclosed. The KVM switch has a MCU circuit for controlling functions of the KVM switch, complete reports of console I/O devices, reading and corresponding transmissions of descriptors; a console device interface chip connected to the MCU; a console port, connected to the console device interface chip; a computer interface chip, connected to the MCU; a re-assignment USB hub chip, connected to the computer interface chip; and a computer port, connected to the re-assignment USB hub chip. Console USB I/O interfaces become dynamic and universal, such that the console I/O devices connected to the control port correspond to the computer port to provide full compatibility, and the console ports can be connected to various console I/O devices without any limitation of device types.

16 Claims, 6 Drawing Sheets

KVM SWITCH HAVING UNIVERSAL INPUT AND PROGRAMMABLE USB HUB AND SWITCHING CONTROL METHOD THEREOF

RELATED APPLICATIONS

This application is a continuation-in-part (CIP) application of U.S. patent application Ser. No. 12/542,338, filed on Aug. 17, 2009 now abandoned.

BACKGROUND OF THE INVENTION

1. Field of the Invention

The present invention relates to a keyboard-video-mouse (KVM) switch, and more particular to a KVM switch having a universal input and programmable universal serial bus (USB) hub.

2. Description of Prior Art

Figure 1:
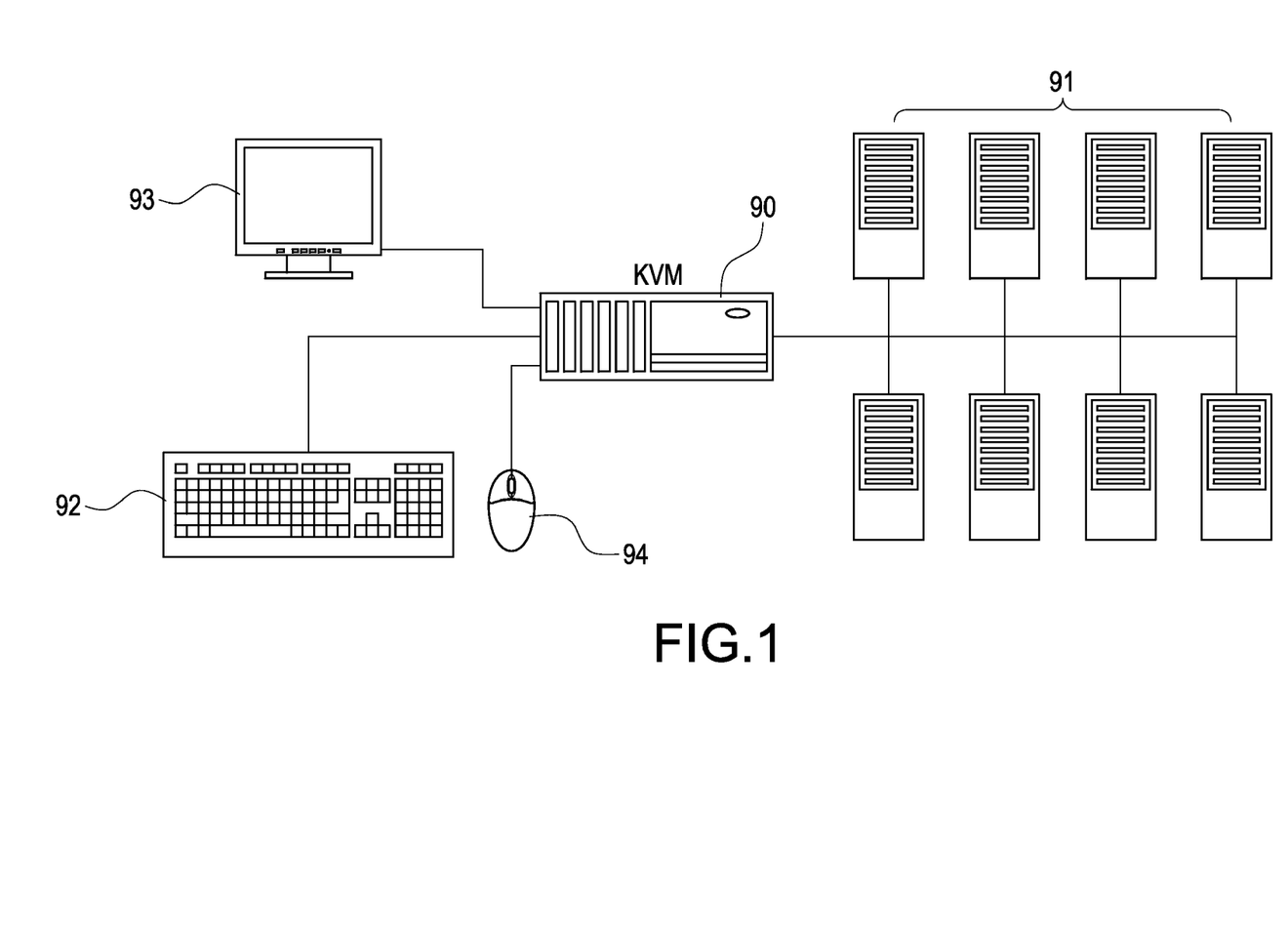
FIG. 1 is a schematic view of a structure of a conventional KVM switch.

At present, a KVM switch is generally used for achieving the effect of controlling and operating a plurality of computers (or servers) by one set of peripherals as shown in FIG. 1, and an end of the KVM switch 90 is connected to a plurality of computers 91, and another end is connected to a keyboard 92, a video display device 93, and a mouse 94. Although the conventional KVM switch can share the function of the keyboard-video-mouse set by its connection. However, a console of the conventional KVM switch includes a USB input/output device connected to a fixed input/output interface and allows users to connect the keyboard, video display device and mouse to specific ports only, but the use of ports cannot be changed or other USB devices such as flash devices, card readers, and digital cameras cannot be connected freely, and thus the scope of applicability and the convenience of operations are limited. Therefore, many USB devices achieve the function of switching operations by switching the connection of a hub, and such arrangement is not an ideal application, since the console input/output interface is fixed, and a corresponding simulation program and a compatible format are limited. The compatibility issue occurs in various different USB devices. Furthermore, a complicated switching circuit and a control firmware programs are required for switching the connection of the hub, not mentioning the separate switching control of any port to a computer port. Therefore, the structure and application of the USB input/output interface of present existing KVM switches and hubs require further improvements.

In view of the shortcomings of the conventional KVM switch, the inventor of the present invention based on years of experience in the related industry to conduct extensive researches and experiments, and finally developed a KVM switch having a universal input and programmable USB hub in accordance with the present invention, and the KVM switch can be adjusted dynamically to provide convenience and economic benefits.

SUMMARY OF THE INVENTION

It is a primary objective of the present invention to provide a KVM switch having a universal input and programmable USB hub and using an appropriate control determination mechanism to change a console USB input/output (I/O) interface into a dynamic and universal form, such that console I/O devices connected to the console port corresponding to computer ports provide a full compatibility, and various USB devices can be connected to the console port without any limitation to the device type, and the USB devices can be replaced during operation to provide tremendous convenience to operations and applications.

Another objective of the present invention is to provide a KVM switch having a universal input and programmable USB hub, such that the USB hub can use a re-assignment USB hub chip for a programmable setup by the console chip of the KVM switch without going through a complicated switch circuit to renew the allocation and configuration of the hub chip so that the connection device connected to each of the hub ports is assigned to the specified computer port based on actual needs. The invention not just achieves a connection of any hub port to any computer port independently, but also simplifies the originally complicated hardware circuit, lowers the cost and enhances the life expectancy and reliability of the KVM switch.

A further objective of the present invention is to provide a KVM switch having a universal input and programmable USB hub, wherein each hub port of the USB hub can be independently allocated to different computer ports, so as to bridges different computer hosts to constitute a KVM switch with the function of bridging computer ports.

To achieve the aforementioned objectives and effects, the present invention provides a KVM switch having a universal input and programmable USB hub, which comprises a main control unit (MCU) having a MCU circuit for controlling functions of the KVM switch, complete reports of console input devices, readings and corresponding transmissions of descriptors; a console device interface chip connected to the MCU; a console port, connected to the console device interface chip; a computer interface chip, connected to the MCU; a re-assignment USB hub chip, connected to the computer interface chip; and a computer port, connected to the re-assignment USB hub chip, such that the computer interface chip transmits the complete reports and descriptors of the console input device to a specified computer port according to the control of the MCU, such that a connected computer host has a similar effect of connecting a console input/output device directly.

To make it easier for the examiner to understand the technical characteristics, features and effects of the present invention, we use preferred embodiments together with related drawings for the detailed description of the present invention as follows.

DETAILED DESCRIPTION OF THE INVENTION

Figure 2:
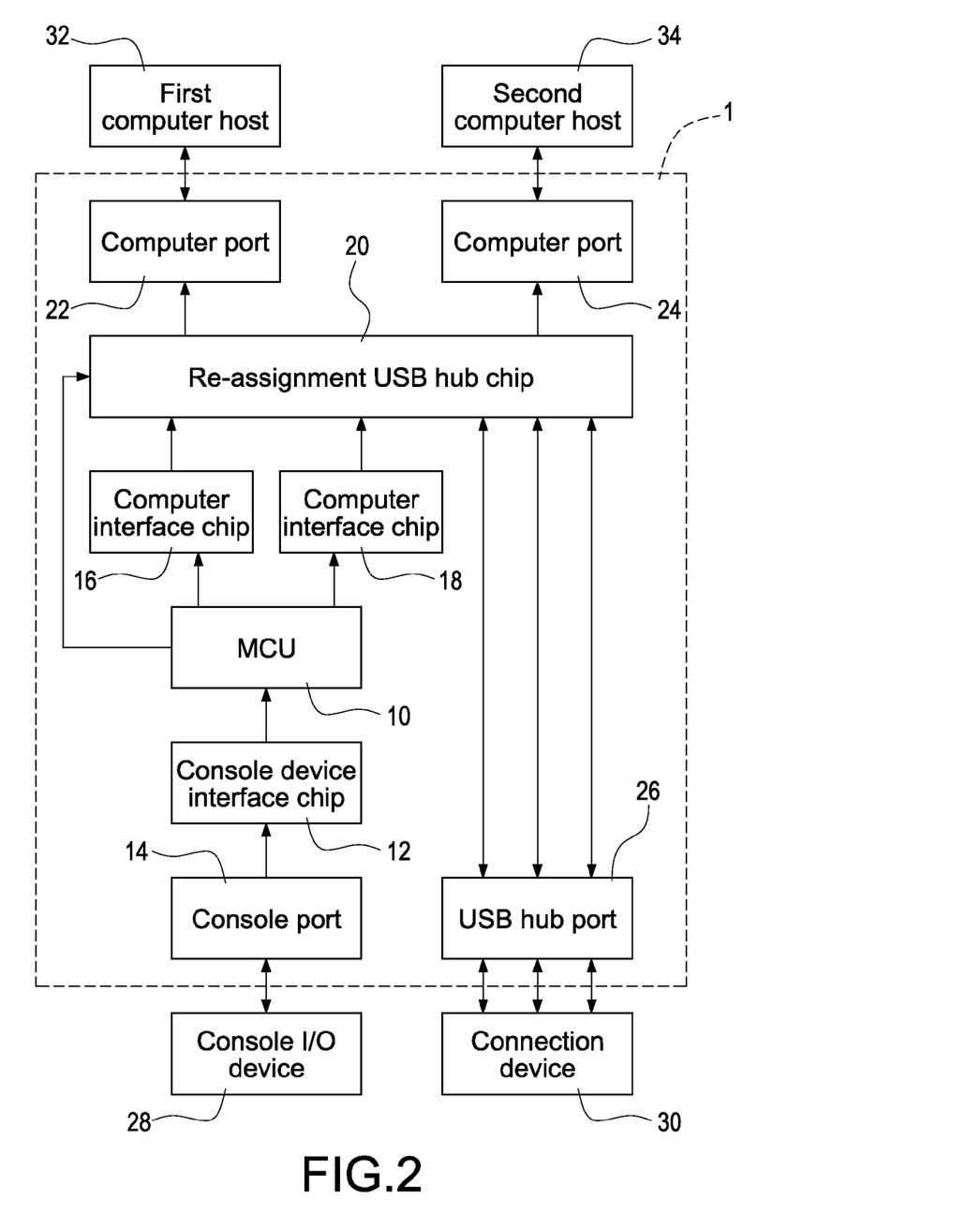
FIG. 2 is a schematic block diagram of a basic structure of the present invention.

With reference to FIG. 2 for a KVM switch having a universal input and programmable USB hub of the present invention, the KVM switch 1 comprises a main control unit (MCU) 10 having a MCU circuit for controlling all functions of the KVM switch 1 and complete reports of a console input/output (I/O) device 28 connected to the KVM switch 1, readings of descriptors and corresponding transmissions. The console I/O device 28 is used to control the KVM switch 1 and control the computer hosts, such as the first computer host 32 and the second computer host 34, connected to the KVM switch 1.

The MCU 10 is connected to a console device interface chip 12, and the console device interface chip 12 is connected to at least one console port 14, and the console port 14 includes a plurality of ports used for connecting to universal serial bus (USB) peripherals, here the console I/O devices 28. The console device interface chip 12 primarily transmits the signal of the console I/O device 28, which is connected to the console port 14, to the MCU 10. Based on a user's need, the signal of the console I/O device 28 is then transmitted to a specified computer interface.

The MCU 10 is connected to computer interface chips 16, 18 separately. Each of the computer interface chips 16, 18 is connected to a re-assignment USB hub chip 20 and has a computer interface circuit. Under the control of the MCU 10, each of the computer interface circuit transmits complete reports of a console I/O device 28, which is connected to the console port 14, and readings of descriptors to specified computer port interfaces (such as the computer ports 22, 24 as shown in the figure). As a result, the connected computer, such as the first computer host 32 and the second computer host 34, can achieve a similar effect of being directly connected to the console I/O device 28. The user can control the console I/O device 28 so as to issue an allocation-configuration instruction to the MCU 10. According to the allocation-configuration instruction, the MCU 10 then specify the computer port 22 or 24.

Figure 3:
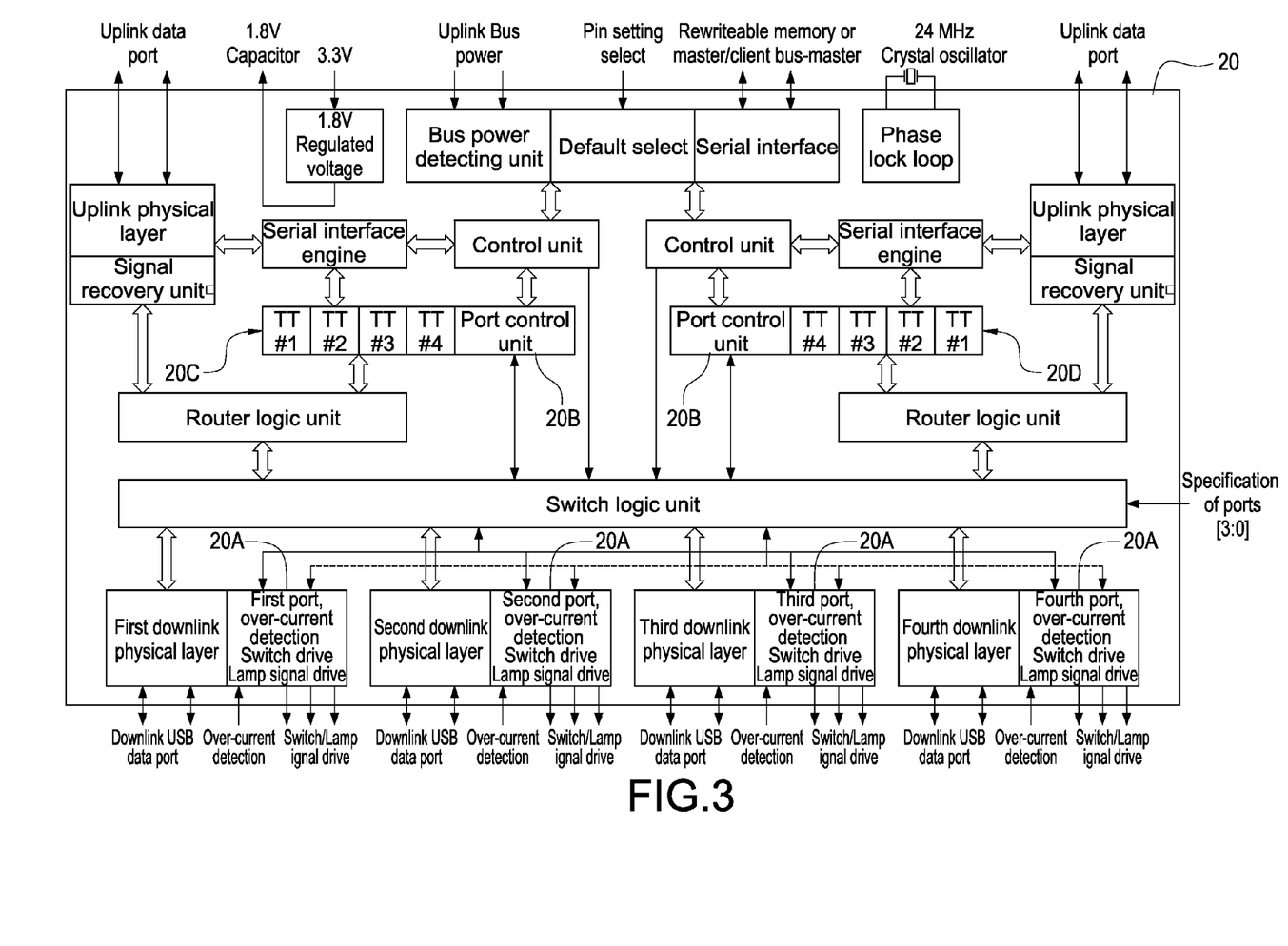
FIG. 3 is a schematic block diagram of a re-assignment USB hub chip of current market sales, which can be used for the re-assignment USB hub chip 20 in FIG. 2.

The re-assignment USB hub chip 20 has a hub chip circuit and is connected to each of the computer ports 22 and 24. FIG. 3 shows a simplified schematic diagram of the re-assignment USB hub chip 20.

As shown in FIG. 3, the re-assignment USB hub chip 20 includes four downlink ports 20A (USB device/Port #1~Port #4) and two uplink ports 20B (Computer end/Port controller), and the re-assignment USB hub chip 20 can be controlled by an external microcomputer chip to assign any port (including but not limited to 1~4) to be connected to the two uplink ports freely (or alternately, but not limited to such arrangement only), such as the connections of the downlink port #1, port #2, port #3 and port #4 to PC1; or the downlink port #1, port #2 and port #3 to PC1 and the downlink port #4 to PC2; or the downlink port #1 and port #2 to PC1 and the downlink port #3 and port #4 to PC2; or the downlink port #1 to PC1 and the downlink port #2, port #3 and port #4 to PC2; or the downlink port #1, port #2, port #3 and port #4 to PC2; or the downlink port #1 and port #3 to PC1 and the downlink port #2 and #4 to PC2; or the downlink port #1 and port #4 to PC1 and the downlink port #2 and port #3 to PC2; or the downlink port #1, #3 and #4 to PC1 and the downlink port #2 to PC2; and the number of combinations is equal to $2^4=16$.

Since the four downlink ports (USB device) have transaction translations (T/T) 20C, 20D independently corresponding to two or more uplink ports (Computer end), so that each downlink port has a quick transmission rate with any of the uplink ports without being affected by a full load of downlink ports. Therefore, the signal of a device of the console port 14 is transmitted directly through the MCU 10 and related circuits to a selected computer interface chip 16, 18, and the re-assignment hub chip 20 operates according to an instruction issued by the MCU 10.

Each of the computer ports 22, 24 is connected to a computer host (such as the first computer host 32 and the second computer host 34 shown in the figure), wherein the re-assignment hub chip 20 is connected to the MCU 10 and each of the computer ports 22 and 24. In addition, the KVM switch 1 further includes a USB hub port 26, which has a plurality of USB ports for connecting to external connection devices 30, such as a thumb drive, a speaker, etc. The USB hub port 26 is connected to the re-assignment hub chip 20 for transmitting the signal of each of the connection devices 30 connected to the USB hub port 26 through the re-assignment hub chip 20 to the specified computer port 22 or 24) directly. That is, the signal is transmitted to the first computer host 32 connected to the computer port 22 or the second computer host 34 connected to the computer port 24.

According to the allocation-configuration instruction, the MCU 10 renews the allocation and configuration of the re-assignment hub chip 20 so that each port of the USB hub port 26 is switched through the circuit of the re-assignment hub chip 20 to a specified computer interface, such as corresponding to the computer interface chip 16, the computer port 22, and the first computer host 32, or corresponding to the computer interface chip 18, the computer port 24, and the second computer host 34. In general, the USB hub port 26 is installed at an end of the same area of the console port 14. That is, the plurality of control devices 28 are installed at an end of the same area of the plurality of connection devices 30 but are not limited to such configuration.

More specifically, the KVM switch 1 is connected through the console port 14 to at least one of the console I/O devices 28, such as a keyboard, and is connected through the USB hub port 26 to at least one of the connection devices 30, such as a thumb drive. As a result, a user can use the console I/O device 28 to issue the allocation-configuration instruction to the MCU 10. According to the allocation-configuration instruction, the MCU 10 then allocates the connected console I/O device 28 to a specified computer port, such as 22 or 24. In addition, according to the allocation-configuration instruction, the MCU 10 further allocates the connected connection device 30 to the specified computer port, such as 22 or 24. Subsequent flowcharts will provide further details on the control method.

The MCU 10 of the KVM switch 1 reads information including a complete report and device descriptors of the console I/O device 28 connected to the console port 14 through the console device interface chip 12. Then, the MCU 10 transmits such information to the specified computer interface chip, such as 16 or 18 to complete a dynamic correspondence of the devices. As a result, the specified computer port 22 and the connected first computer host 32, or the specified computer port 24 and the connected second computer host 34, can be communicated and connected completely to the corresponding console I/O device 28, overcoming the compatibility issue and allowing users to connect other devices or reset the correspondence and connection anytime. The invention has the advantages and effects as follows:

1. If the console I/O device 28 the console port 14 is connected to is a keyboard, and a specified computer is powered on, that computer's BIOS will receive complete USB communications of the console I/O device 28 and have no compatibility issue with the type of a keyboard or computer operating system, so as to achieve the effect of connecting different platforms.

2. If the console port 14 is connected to the console I/O device 28 other than a keyboard, the MCU 10 can, according to the characteristics of the connected console I/O device 28, set how the allocation-configuration instruction should be issued. For example, if the connected console I/O device 28 is a mouse, the "PgUp" or "PgDn" operation of the mouse can be programmed as a switching hotkey. Alternatively, the on screen display (OSD) can be used as the means of switching. The user can even switch by pressing buttons on the KVM switch 1 or press a touch screen. Therefore, the means of issuing the allocation-configuration instruction can be expanded to the console I/O device 28 other than a keyboard. There is no limit on the type of the console I/O device 28.

3. The computer interface chips 16, 18 are in a dynamic correspondence mode, so that if each of the console ports 14 is connected to the console I/O device 28 other than the keyboard (such as a mouse, a joystick or a touch panel), the computer interface chips 16, 18 can be reconfigured by the MCU 10 anytime without requiring a rebooting or burning process.

4. The console I/O device 28 connected to each of the console ports 14 can be a personal system/2 (PS/2) to USB adapter, and each of the computer interface chips 16, 18 responds to complete USB communications to achieve the function of connecting a plurality of console interface devices.

The invention allows the allocation-configuration instruction to be issued via the console I/O device 28 through a hotkey or an on screen display (OSD) screen to the MCU 10. As will be explained later, a button on the KVM switch 1 can also be used to issue the allocation-configuration instruction to the MCU 10. The MCU 10 renews the allocation and configuration of the re-assignment hub chip 20 according to the allocation-configuration instruction. Any port connected to the USB hub ports 26 can be switched synchronously with the console port 14, or any of the USB hub ports 26 can be connected to any computer port 22, 24 alternately.

All settings for completing a switching and a wire wrapping can be completed by the MCU 10 through controlling the re-assignment hub chip 20, without requiring any external switch circuit or control circuit, so as to achieve a reduced structure, a lower cost, a more powerful function, a higher reliability and a longer life than the conventional KVM switch.

Since the present invention includes the re-assignment hub chip 20, therefore the USB hub port 26 can be used for bridging the first computer host 32 and the second computer host 34 connected to the two computer ports 22, 24, and the KVM switch 1 of the present invention also has the function of bridging computers.

Figure 4:
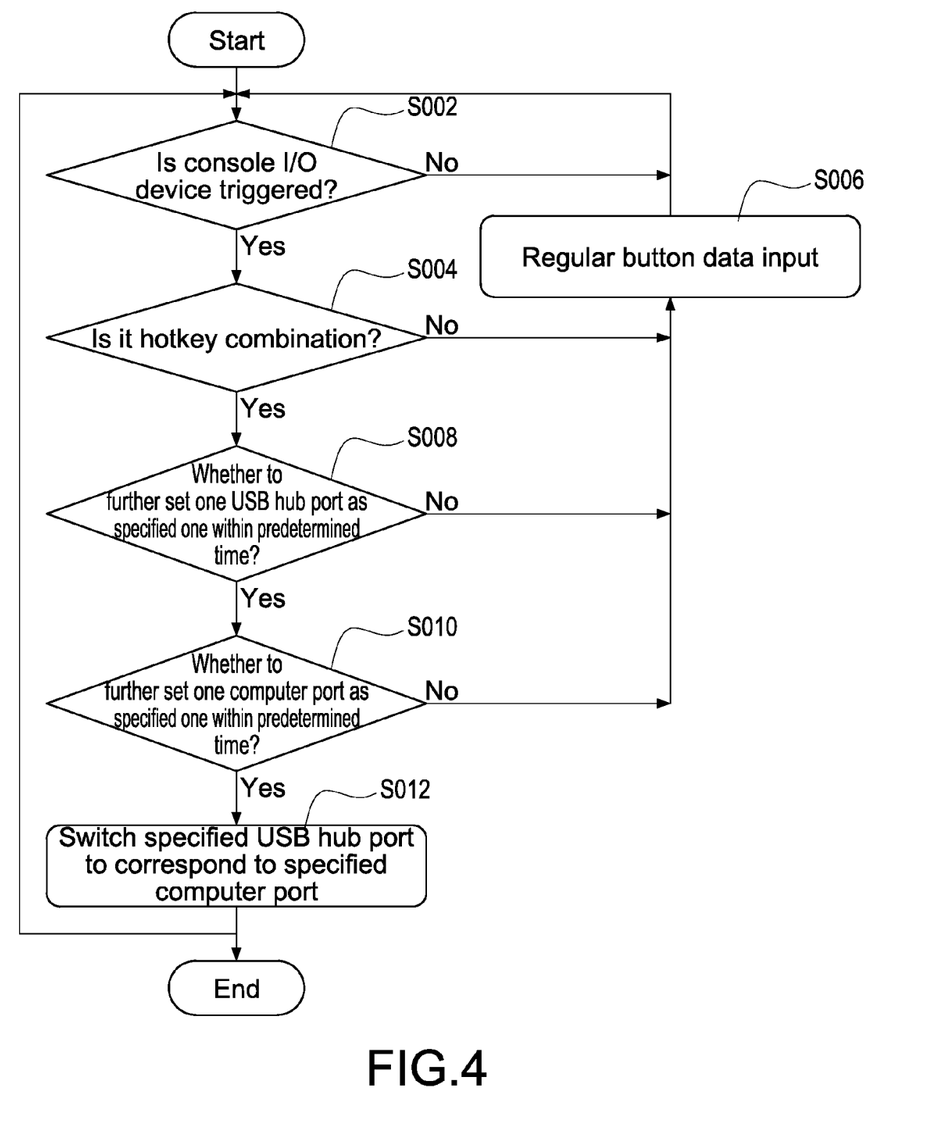
FIG. 4 is a first switching flowchart of the present invention.

Please refer to FIG. 4, the first switching flowchart of the present invention. In step S002, the KVM switch 1 first determines whether the console I/O device 28 connected to the console port 14 is triggered. If the console I/O device 28 is triggered, the KVM switch 1 then determines in step S004 whether a hotkey combination is triggered. If a hotkey combination is not triggered, the KVM switch 1 recognizes the input as regular button data input in step S006. Examples of the hotkey combination include pressing the Ctrl button or the Enter button on the keyboard twice. Therefore, a single press on the Ctrl button or a combination of the Ctrl button and some other functional button not for setting will not be recognized as the aforementioned hotkey combination.

After step S004, the KVM switch 1 in step S008 determines whether one of the USB hub ports 26 is specified within a predetermined time. That is, whether one of the USB hub ports 26, such as Port 1 or Port 2, etc., is specified. When one of the USB hub ports 26 is specified, in step S010 it's further determined whether to specify one of the computer ports 22 and 24 within the predetermined time. Because there is no sequential relationship between step S008 and step S010, step S010 can be performed before step S008. However, if step S008 and step S010 are not performed at the same time, or they are performed beyond the predetermined time, such as but not limited to 3 seconds, the KVM switch 1 will recognize the operations as regular button date input.

For example, a user can press the following keys on the console I/O device 28, such as a keyboard, in turn within the predetermined time, such as within 3 seconds: hotkey, hotkey, H1, and P2. After the hotkey is pressed twice, the KVM switch 1 recognizes that the user wants to perform configuration rather than input data. Then, the pressing of key H1 means that the USB hub port 26 that is specified is Port 1. Subsequently, the pressing of key P2 means that the computer port 24 connected to the second computer host 34 is specified.

After step S008 and step S010, in step S012 the MCU 10 renews the allocation and configuration of the re-assignment USB hub chip 20, so as to switch the specified USB hub port 26 to correspond to the specified computer port, either 22 or 24. By this means, a user can issue the allocation-configuration instruction by pressing the hotkey combination on the console I/O device 28, so as to switch the specified USB hub port 26 to correspond to the specified computer port 22 or 24.

In the previous example, after the hotkey combination of hotkey, hotkey, H1, and P2 is pressed, the MCU 10 will renew the allocation and configuration of the re-assignment USB hub chip 20 according to the allocation-configuration instruction, correspondingly allocating the connection device 30, which is connected with Port 1 of the USB hub port 26, to the second computer host 34, which is connected to the computer port 24. As a result, when other devices on the KVM switch 1 are switched, the connection device 30 connected to the Port 1 will not be switched, but will still be connected with the second computer host 34.

Figure 5:
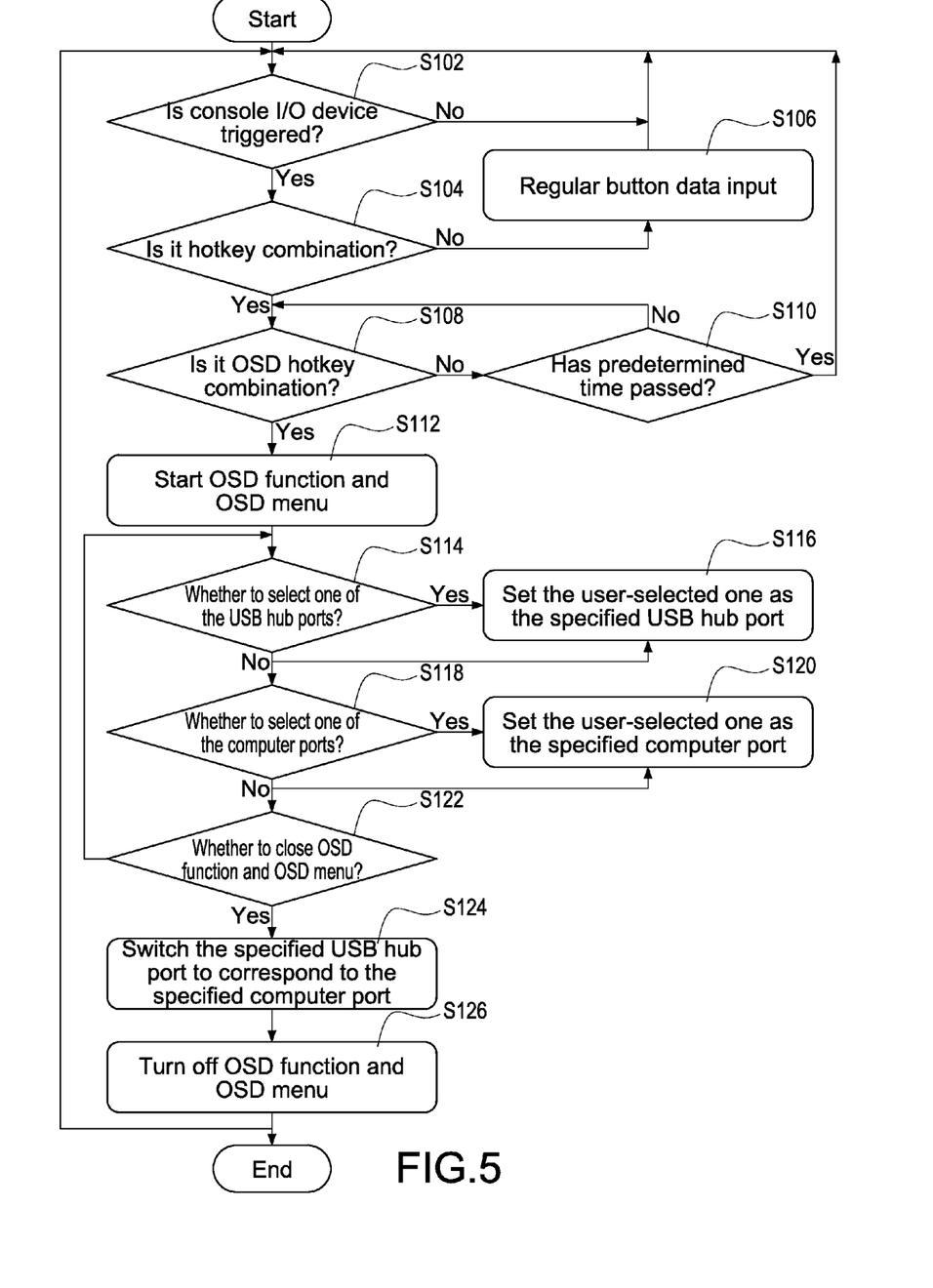
FIG. 5 is a second switching flowchart of the present invention.

Please refer to FIG. 5, which is the second switching flowchart of the present invention. In step S102, the KVM switch 1 first determines whether the console I/O device 28 connected to the console port 14 is triggered. If the console I/O device 28 is triggered, in step S104 it's further determined whether a hotkey combination is triggered. If a hotkey combination is not triggered, in step S106 it will be recognized as regular button data input. If a hotkey combination is triggered, in step S108 it's further determined whether an OSD hotkey combination is triggered. If the answer is no, in step S110 it's further determined whether the predetermined time has passed. If it's still within the predetermined time, step S108 is resumed to keep waiting for input. If the predetermined time has passed, it will be recognized as the hotkey combination input in the aforementioned FIG. 4.

If in step S108 it's determined that the OSD hotkey combination is triggered, in step S112 a screen, not shown in the figures, connected to the KVM switch 1 will start the OSD function and display the OSD menu. Then, in step S114, it's determined whether the user has selected one of the USB hub ports 26. In step S118, it's determined whether the user has selected one of the computer ports 22 and 24. There is no sequential relationship between steps S114 and S118; step S118 can also be performed before, or at the same time with, step S114.

If the user selects one of the USB hub ports 26 in step S114, in step S116 the KVM switch 1 will set the user's selection as the specified USB hub port. If the user selects one of the computer ports 22 and 24 in step S118, in step S120 the KVM switch 1 will set the user's selection as the specified computer port.

If the user does not make any selections among the USB hub ports 26 and/or the computer ports 22 and 24, the default ones of the USB hub ports 26 and/or the computer ports 22 and 24 will be set as the specified USB hub port 26 and/or the specified computer port 22 or 24.

After the aforementioned selection and setting, in step S122 it's determined whether to turn off the OSD function and the OSD menu. If the answer is no, the user can input his/her selection later. If the answer is yes, the MCU 10 will renew the allocation and configuration of the re-assignment USB hub chip 20, so as to switch the specified USB hub port 26 to the corresponding specified computer port 22 or 24 in step S 124, then turn off the OSD function and OSD menu in step S126.

Therefore, the user can view the OSD menu displayed on the screen, and use the keyboard, the mouse, or the touch screen to do the selection, so as to specify one of the USB hub ports 26, and one of the computer ports 22 and 24, and issue the allocation-configuration instruction to the MCU 10. The MCU 10 then renews the allocation and configuration of the re-assignment USB hub chip 20 according to the allocation-configuration instruction.

Figure 6:
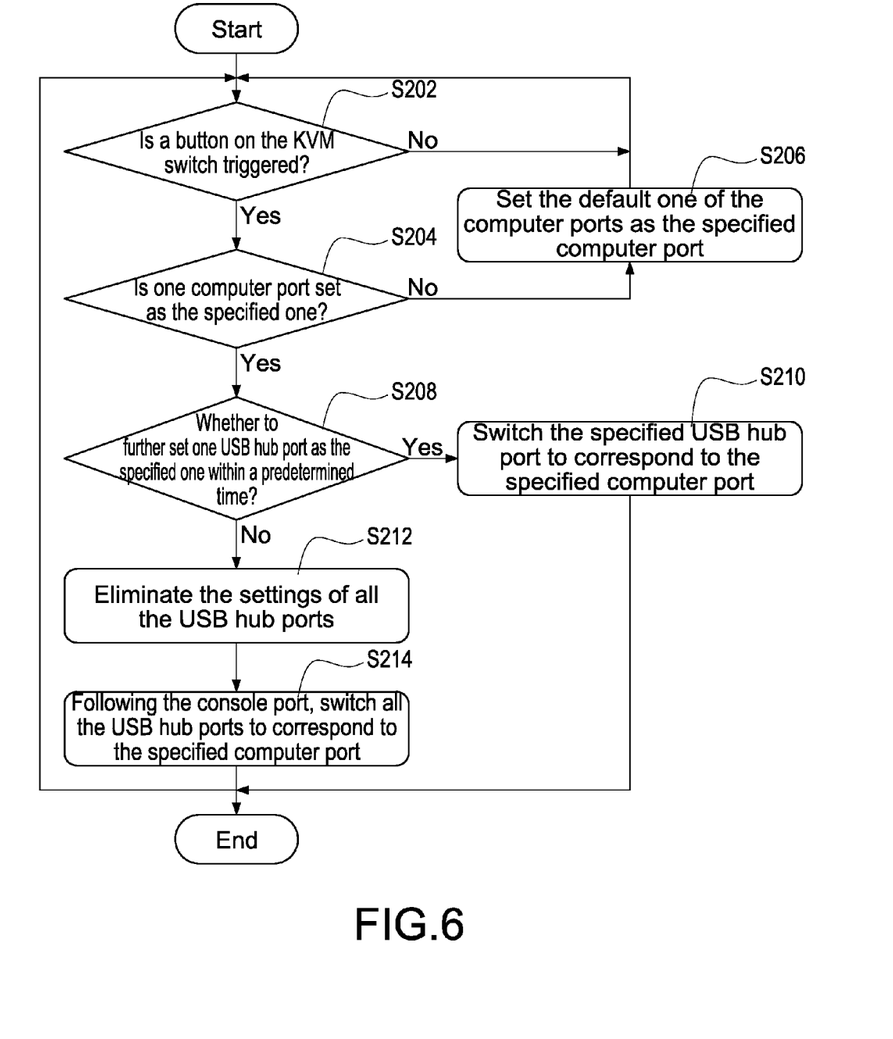
FIG. 6 is a third switching flowchart of the present invention.

Please refer to FIG. 6, the third switching flowchart of the present invention. In this embodiment, the KVM switch 1 has a plurality of buttons, not shown in the figures, corresponding to the computer ports 22 and 24. For example, if the button corresponding to the computer port 22 is pressed, all of the console ports 14 and the USB hub ports 26 not specified will be switched and connected to the first computer host 32. On the other hand, if the button corresponding to the computer port 24 is pressed, all of the console ports 14 and the USB hub ports 26 not specified will be switched and connected to the second computer host 34.

In step S202, it's first determined whether the buttons on the KVM switch 1 is triggered. If the answer is yes, then in step S204 it's determined whether one of the computer ports 22 and 24 is specified. If none of the computer ports 22 and 24 is specified, a default one of the two will be set as the specified computer port.

After one of the computer ports 22 and 24 is specified, in step S208 it's further determined whether one of the USB hub ports 26 is specified within the predetermined time. If the answer is yes, then in step S210 the MCU 10 renews the allocation and configuration of the re-assignment USB hub chip 20 to switch the specified USB hub port 26 to correspond to the specified computer port 22 or 24.

For example, the user can press the button corresponding to the computer port 22, then, press the button 3 times within the predetermined time, such as 3 seconds. This means that the user is specifying the computer port 22 connected to the first computer host 32, and specifying the Port 3 of the USB hub port 26. Thus, the KVM switch 1 will switch the connection device 30, which is connected to the Port 3 of the USB hub port 26, to the first computer host 32. This only serves as an example but not a limitation.

If the user does not set a specified the USB hub port 26, the KVM switch 1 will eliminate all the settings of the USB hub ports 26 in step S212. Furthermore, all the USB hub ports 26 will follow the console port 14 to switch to the specified computer port 22 or 24 in step S214. For example, when the button corresponding to the computer port 24 is pressed, if the user does not set a specified USB hub port 26 within the predetermined time, the KVM switch 1 will connect all the console I/O devices 28 and the connection devices 30 to the second computer host 34 connected to the corresponding computer port 24.

Although there are two computer ports 22 and 24 and two computer interface chips 16 and 18 in these embodiments, the numbers serve only as an example. A KVM switch designed according to the present invention can be connected to any number of computers hosts and the number needs not be two.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A keyboard-video-mouse (KVM) switch having a universal input and programmable universal serial bus (USB) hub, comprising:

a main control unit (MCU), having a MCU circuit, for controlling all functions of the KVM switch, and complete reports of a console input/output (I/O) device connected to the KVM switch, readings of a descriptor and corresponding transmissions;

a console device interface chip, connected to the MCU;

a console port, connected to the console device interface chip, through the console port the KVM switch being connected to the console I/O device;

a computer interface chip, connected to the MCU, the computer interface chip having a computer interface chip circuit;

a re-assignment USB hub chip, connected to the computer interface chip; and a computer port, connected to the re-assignment USB hub chip, through the computer port the KVM switch being connected to a computer host;

thereby, the computer interface chip transmits the complete reports and descriptors of the console I/O device to the specified computer port according to a control of the MCU, such that a connected computer host has a similar effect of being connected to the console I/O device directly, the MCU specifies the computer port according to a received allocation-configuration instruction, the allocation-configuration instruction is issued to the MCU through controlling the console I/O device.

2. The KVM switch having a universal input and programmable USB hub of claim 1, further comprising a USB hub port having a plurality of ports for being connected to external connection devices, the USB hub port being connected to the re-assignment USB hub chip, the re-assignment USB hub chip being connected to the MCU, the MCU renewing the allocation configuration of the re-assignment USB hub chip according to the allocation-configuration instruction, such that a specified one of the USB hub port is allocated to a specified one of the computer port.

3. The KVM switch having a universal input and programmable USB hub of claim 1, wherein the re-assignment USB hub chip includes four downlink ports and two uplink ports, and the four downlink ports are provided for independently processing a conversion unit and corresponsive to the two uplink ports.

4. The KVM switch having a universal input and programmable USB hub of claim 1, wherein the console I/O device is selected from a group consisting of a keyboard, a mouse, and a monitor.

5. The KVM switch having a universal input and programmable USB hub of claim 1, wherein the console port includes a plurality of ports used for connecting to USB peripherals.

6. A switching control method used by a KVM switch, the KVM switch having a MCU, a re-assignment USB hub chip, a console port, a plurality of computer ports, and a USB hub port, wherein the KVM switch is connected to a console I/O device through the console port and the USB hub port has a plurality of ports, the switching control method comprising:

a) determining whether the console I/O device is triggered;
b) if the console I/O device is triggered, determining whether it is a hotkey combination that is triggered;
c) if the hotkey combination is triggered, determining whether a specified USB hub port is set within a predetermined time;
d) if the hotkey combination is triggered, determining whether a specified computer port is set within the predetermined time; and
e) if the specified USB hub port and the specified computer port are set, the MCU renewing the allocation and configuration of the re-assignment USB hub chip so as to allocate the specified USB hub port to correspond to the specified computer port.

7. The switching control method used by a KVM switch of claim 6, wherein the predetermined time is three seconds.

8. The switching control method used by a KVM switch of claim 6, further comprising:
f) if a false answer results from the determination of step b, step c, or step d, concluding that there is regular button data input.

9. The switching control method used by a KVM switch of claim 6, further comprising:
g) if the hotkey combination is triggered, determining whether an OSD hotkey combination is triggered;
h) if the OSD hotkey combination is triggered, starting an OSD function and an OSD menu; and
i) following step h, setting the specified USB hub port and the specified computer port according to the OSD menu.

10. The switching control method used by a KVM switch of claim 9, wherein step i further comprises:
i1) determine whether one of the USB hub port is selected;
i2) following step i1, if one of the USB hub port is selected, setting the user-selected one as the specified USB hub port;
i3) following step i1, if none of the USB hub port is selected, setting a default one of the USB hub port as the specified USB hub port;
i4) determine whether one of the computer ports is selected;
i5) following step i4, if one of the computer ports is selected, setting the user-selected one as the specified computer port; and
i6) following step i4, if none of the computer ports is selected, setting a default one of the computer ports as the specified computer port.

11. The switching control method used by a KVM switch of claim 9, further comprising:
j) following step g, if the OSD hotkey combination is not triggered, determining whether the predetermined time has passed; and
k) following step j, if the predetermined time has not passed, keeping determining whether the OSD hotkey combination is triggered.

12. The switching control method used by a KVM switch of claim 11, wherein the predetermined time is three seconds.

13. A switching control method used by a KVM switch, the KVM switch having a MCU, a re-assignment USB hub chip, a plurality of computer ports, and a USB hub port, wherein the USB hub port has a plurality of ports, and the KVM switch has a plurality of buttons corresponding to the plurality of computer ports, the switching control method comprising:
a) determining whether the plurality of buttons of the KVM switch are triggered;
b) if one of the plurality of buttons is triggered, determining whether a specified computer port is set;
c) if the specified computer port is set, determining whether a specified USB hub port is set within a predetermined time; and
d) if the specified computer port and the specified USB hub port are set, the MCU renewing the allocation and configuration of the re-assignment USB hub chip so as to allocate the specified USB hub port to correspond to the specified computer port.

14. The switching control method used by a KVM switch of claim 13, wherein the predetermined time is three seconds.

15. The switching control method used by a KVM switch of claim 13, further comprising:
e) following step b, if no specified computer port is set, setting a default one of the computer ports as the specified computer port.

16. The switching control method used by a KVM switch of claim 13, further comprising:
f) following step c, if no specified USB hub port is set within the predetermined time, eliminating all the settings of the USB hub port; and
g) following the console ports of the KVM switch, switching all of the USB hub port to the specified computer port.

\* \* \* \* \*